US012230465B2

(12) United States Patent
Lee et al.

(10) Patent No.: US 12,230,465 B2
(45) Date of Patent: Feb. 18, 2025

(54) RELAY SWITCH DEVICE INTEGRATED WITH PRE-CHARGE SYSTEM

(71) Applicant: LG Energy Solution, Ltd., Seoul (KR)

(72) Inventors: Won-Tae Lee, Daejeon (KR); Young-Jun Lee, Daejeon (KR); Jae-Hyuk Cha, Daejeon (KR); Sung-Tack Hwang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 178 days.

(21) Appl. No.: 18/022,599

(22) PCT Filed: Oct. 26, 2021

(86) PCT No.: PCT/KR2021/015138
§ 371 (c)(1),
(2) Date: Feb. 22, 2023

(87) PCT Pub. No.: WO2022/092778
PCT Pub. Date: May 5, 2022

(65) Prior Publication Data

US 2023/0317392 A1 Oct. 5, 2023

(30) Foreign Application Priority Data

Oct. 27, 2020 (KR) ........................ 10-2020-0140709

(51) Int. Cl.
*H01H 50/12* (2006.01)
*H01H 50/54* (2006.01)
*H01H 51/29* (2006.01)

(52) U.S. Cl.
CPC .......... *H01H 50/546* (2013.01); *H01H 50/12* (2013.01); *H01H 51/29* (2013.01); *H01H 2225/004* (2013.01); *H01H 2225/008* (2013.01)

(58) Field of Classification Search
CPC ...... H01H 50/546; H01H 50/12; H01H 51/29; H01H 2225/004; H01H 2225/008;
(Continued)

(56) References Cited

U.S. PATENT DOCUMENTS 4,437,020 A 3/1984 Schrother
2007/0241847 A1* 10/2007 Yamamoto ........... H01H 50/305 335/196

(Continued)

FOREIGN PATENT DOCUMENTS

EP 3511996 A1 7/2019
EP 3450742 B1 9/2019

(Continued)

OTHER PUBLICATIONS

Extended European Search Report including Written Opinion for Application No. 21886772.9 dated Jan. 4, 2024, pp. 1-10.

(Continued)

*Primary Examiner* — Shawki S Ismail
*Assistant Examiner* — Lisa N Homza
(74) *Attorney, Agent, or Firm* — Lerner David LLP

(57) ABSTRACT

Provided is a relay switch device including a relay housing, a first upper fixing terminal and a second upper fixing terminal arranged side by side over an inside and an outside of the relay housing, a first lower fixing terminal electrically connected to the first upper fixing terminal and arranged under the first upper fixing terminal to be apart a predetermined distance from the first upper fixing terminal, and a second lower fixing terminal electrically connected to the second upper fixing terminal and arranged under the second upper fixing terminal to be apart a predetermined distance from the second upper fixing terminal, and a circuit mode switch module provided to selectively contact the first and
(Continued)

second upper fixing terminals or the first and second lower fixing terminals by moving a predetermined distance.

10 Claims, 5 Drawing Sheets

(58) Field of Classification Search
CPC .... H01H 33/16; H01H 33/166; H01H 50/543; H01H 50/541; H01H 50/14; H01H 50/58; H01H 51/065; H01H 50/02
USPC .......................................................... 335/196
See application file for complete search history.

(56) References Cited

U.S. PATENT DOCUMENTS

| | | | | |
|---|---|---|---|---|
| 2009/0322453 | A1* | 12/2009 | Kawaguchi | H01F 7/1615 335/81 |
| 2009/0322454 | A1* | 12/2009 | Tanaka | H01H 50/38 335/189 |
| 2009/0322455 | A1* | 12/2009 | Yoshihara | H01H 51/2209 335/189 |
| 2017/0025872 | A1 | 1/2017 | Kang | |
| 2017/0069452 | A1* | 3/2017 | Hiroki | H01H 50/546 |
| 2019/0229377 | A1 | 7/2019 | Kim | |

FOREIGN PATENT DOCUMENTS

| | | | |
|---|---|---|---|
| JP | 2005536013 | A | 11/2005 |
| JP | 2009268214 | A | 11/2009 |
| JP | 2012174676 | A | 9/2012 |
| JP | 2018142503 | A | 9/2018 |
| KR | 100792930 | B1 | 1/2008 |
| KR | 100845539 | B1 | 7/2008 |
| KR | 101006307 | B1 | 1/2011 |
| KR | 101251921 | B1 | 4/2013 |
| KR | 20150003570 | U | 10/2015 |
| KR | 20170000325 | U | 1/2017 |
| KR | 20170000404 | U | 2/2017 |
| KR | 101745055 | B1 | 6/2017 |
| KR | 20170099287 | A | 8/2017 |
| KR | 102097642 | B1 | 4/2020 |
| WO | 2004015728 | A1 | 2/2004 |
| WO | 2009144188 | A1 | 12/2009 |

OTHER PUBLICATIONS

International Search Report for Application No. PCT/KR2021/015138 mailed Feb. 25, 2022, pp. 1-3.

* cited by examiner

RELAY SWITCH DEVICE INTEGRATED WITH PRE-CHARGE SYSTEM

CROSS-REFERENCE TO RELATED APPLICATIONS

The present application is a national phase entry under 35 U.S.C. § 371 of International Application No. PCT/KR2021/015138 filed Oct. 26, 2021, which claims priority from Korean Patent Application No. 10-2020-0140709 filed Oct. 27, 2020, all of which are incorporated herein by reference.

TECHNICAL FIELD

The present disclosure relates to a relay switch device for use in controlling an electrical connection between a battery pack and a load.

BACKGROUND ART

Large-capacity battery packs are mounted on electric vehicles (EVs), hybrid vehicles (HVs), energy storage systems (ESS), and the like.

A battery pack is connected to a load through a relay circuit unit. The load refers to a device that receives power from a battery pack, such as a motor or inverter.

As shown in FIG. 1, the relay circuit unit includes a high potential main relay 10 installed on a line that connects a positive electrode terminal of a battery pack B to a positive electrode terminal of a load L, and a low potential main relay 20 installed on a line that connects a negative electrode terminal of the battery pack B to a negative electrode terminal of the load L.

When the battery pack B is electrically connected to the load L, a large voltage of the battery pack B is abruptly applied to the load L, and thus an inrush current initially flows toward the load L. The inrush current may cause irreversible damage by applying an electric shock to the relay circuit unit or a circuit included in the load L.

Thus, a conventional relay circuit unit includes an RC circuit including a pre-charge resistor 40 and a capacitor 50, and a pre-charge relay 30 connected to the high potential main relay 10 in parallel, When the battery pack B and the load L intend to be electrically connected to each other, the low potential main relay 20 and the pre-charge relay 30 are primarily turned on. Then, because the current output from the battery pack B flows to the load L through the RC circuit, the magnitude of the current gradually increases.

When the pre-charge relay 30 is turned on and the magnitude of the current increases to a degree that does not impact the load L, the high potential main relay 10 is secondarily turned on, and then the pre-charge relay 30 is turned off, thereby completing an electrical connection between the battery pack B and the load L.

In the art, as described above, components for controlling an electrical connection between a battery pack and a load are collectively referred to as a battery disconnect unit (BDU). The BDU (refer to FIG. 2) includes the high potential main relay 10, the low potential main relay 20, the pre-charge relay 30, a pre-charge resistor 40, and the like, and also includes wires or bus bars 60 for electrically connecting them, and a housing 70 for accommodating the aforementioned components.

Recently, the BDU is configured to perform more functions than in the conventional art. For example, the BDU is designed to accomplish even a power distribution function that has been in charge of a conventional electric vehicle. To this end, recent BDUs are equipped with a larger number of bus bars, relays, and other related components in a housing than the conventional ones. As a result, the price of such a BDU is getting higher, and the size thereof is getting bigger. In general, a BDU is mounted inside a battery pack, and such a large BDU acts as a negative factor in reducing the size of the battery pack and increasing an energy density.

Therefore, a method for reducing the size of the BDU by integrating several component parts embedded in the BDU possibly into one component is being sought.

SUMMARY

Technical Problem

The present disclosure is designed to solve the problems of the related art, and therefore the present disclosure is directed to providing a relay switch device capable of serving as a conventional high potential main relay, a conventional pre-charge relay, and a conventional pre-charge resistor, thereby contributing to miniaturization of a battery disconnect unit (BDU) and an increase in the energy density of a battery pack.

The technical problems to be solved in the present disclosure are not limited to the above, and other problems that are not mentioned could be clearly understood by one of ordinary skill in the art from the description of the present disclosure below.

Technical Solution

In one aspect of the present disclosure, there is provided a relay switch device including a relay housing: a first upper fixing terminal and a second upper fixing terminal arranged side by side and separated by a fixed distance, and extending through the relay housing: a first lower fixing terminal electrically connected to the first upper fixing terminal and arranged under the first upper fixing terminal and separated by a predetermined distance from the first upper fixing terminal, a second lower fixing terminal electrically connected to the second upper fixing terminal and arranged under the second upper fixing terminal and separated by the predetermined distance from the second upper fixing terminal; and a circuit mode switch module configured to be movable by a predetermined distance and selectively contact the first and second upper fixing terminals or the first and second lower fixing terminals, wherein node voltages in the first upper fixing terminal and the second upper fixing terminal are made substantially equal in response to the circuit mode switch module contacting the first and second upper fixing terminals, and wherein the node voltages in the first upper fixing terminal and the second upper fixing terminal are made substantially different in response to the circuit mode switch module contacting the first and second lower fixing terminals.

The circuit mode switch module may include a moving shaft configured to be elevated and lowered within the relay housing: a contact plate made of an electrically conductive material, mounted on the moving shaft, and configured to contact the first and second upper fixing terminals when the moving shaft ascends to a first predetermined location; and a resistive member mounted on the moving shaft, positioned below the contact plate, and configured to contact the first and second lower fixing terminals to be electrically connectable to the first and second lower fixing terminals when the moving shaft descends to a second predetermined location, the resistive member comprising a resistor within an insulating case.

The resistive member may include a first terminal protruding downward from a first portion of the resistive member that faces the first lower fixing terminal; and a second terminal protruding downward from a second portion of the resistive member that faces the second lower fixing terminal.

The resistive member may be a thermoelectric device configured to absorb heat within the relay housing.

The thermoelectric device may be arranged such that a heat absorbing side faces a lower portion of the relay housing.

The relay switch device may further include a driving module located below the first and second lower fixing terminals within the relay housing and including a coil configured to generate an electromagnetic force capable of moving the moving shaft.

The coil portion may be cylindrical and includes a central passage with an empty center, and the moving shaft may extend along the central passage.

A circuit mode switch module of a relay switch device according to another embodiment of the present disclosure may include a moving shaft configured to be elevated and lowered within the relay housing: a contact plate connected to the moving shaft, and configured to selectively contact the first and second upper fixing terminals or the first and second lower fixing terminals according to an elevating/lowering operation of the moving shaft: a first wire connecting the first upper fixing terminal to the first lower fixing terminal; a second wire connecting the second upper fixing terminal to the second lower fixing terminal; and a resistor provided on at least one of the first wire and the second wire.

In another aspect of the present disclosure, there is provided a battery disconnect unit including the relay switch device of any of the embodiments herein.

In another aspect of the present disclosure, there is provided a battery pack including the above-described battery disconnect unit.

Advantageous Effects

According to an aspect of the present disclosure, a relay switch device capable of serving as a conventional high-potential main relay, a conventional pre-charge relay, and a conventional pre-charge resistor may be provided.

In other words, when an electrical connection between a battery pack and a load is controlled, the relay switch device of the present disclosure may implement a pre-charge circuit without using an existing pre-charge relay and an existing pre-charge resistor.

It will be understood by those of ordinary skill in the art from the following description that various embodiments according to the present disclosure can solve several technical problems not mentioned above.

DETAILED DESCRIPTION

The present disclosure will now be described more fully with reference to the accompanying drawings, in which exemplary embodiments of the present disclosure are shown. Terms or words used in the present specification and claims should not be interpreted as being limited to typical or dictionary meanings, but should be interpreted as having meanings and concepts, which comply with the technical aspects of the present disclosure, based on the principle that an inventor can appropriately define the concept of the term to describe his/her own application in the best manner.

Therefore, configurations illustrated in the embodiments and the drawings described in the present specification are only embodiments of the present disclosure and do not represent all of the technical aspects of the present disclosure, and thus it is to be understood that various equivalents and modified examples, which may replace the configurations, are possible when filing the present disclosure.

A relay switch device to be described below is installed in a high current transmission line for transmitting the power of a battery pack to an electric vehicle (EV) or a hybrid vehicle (HV) and is used to control an electrical connection between the battery pack and a load of a vehicle. However, the scope of the present disclosure is not limited by this purpose. For example, a relay switch device according to the present disclosure may be installed in a charging current line connecting an external charger to a battery pack.

Figure 1:
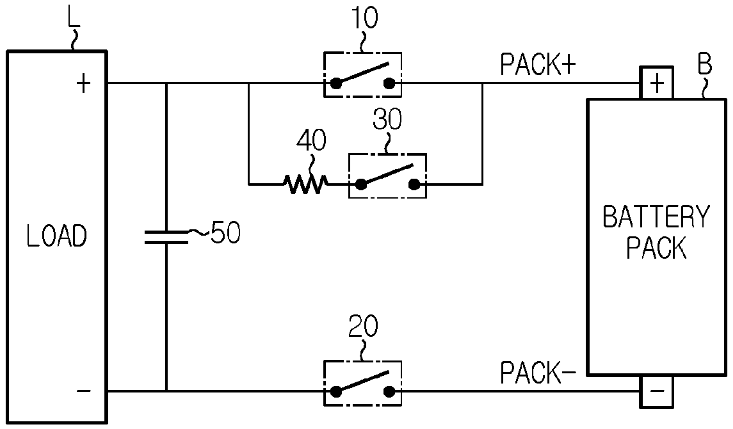
PRIOR ART FIG. 1
FIG. 1 is a circuit diagram of a relay circuit unit interposed between a battery pack and a load.
Figure 2:
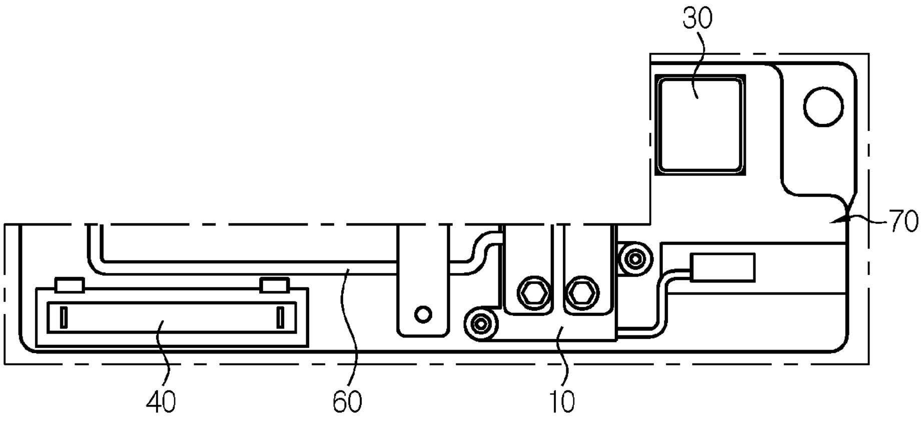
FIG. 2 schematically illustrates a portion of a structure of a conventional battery disconnect unit (BDU).
Figure 3:
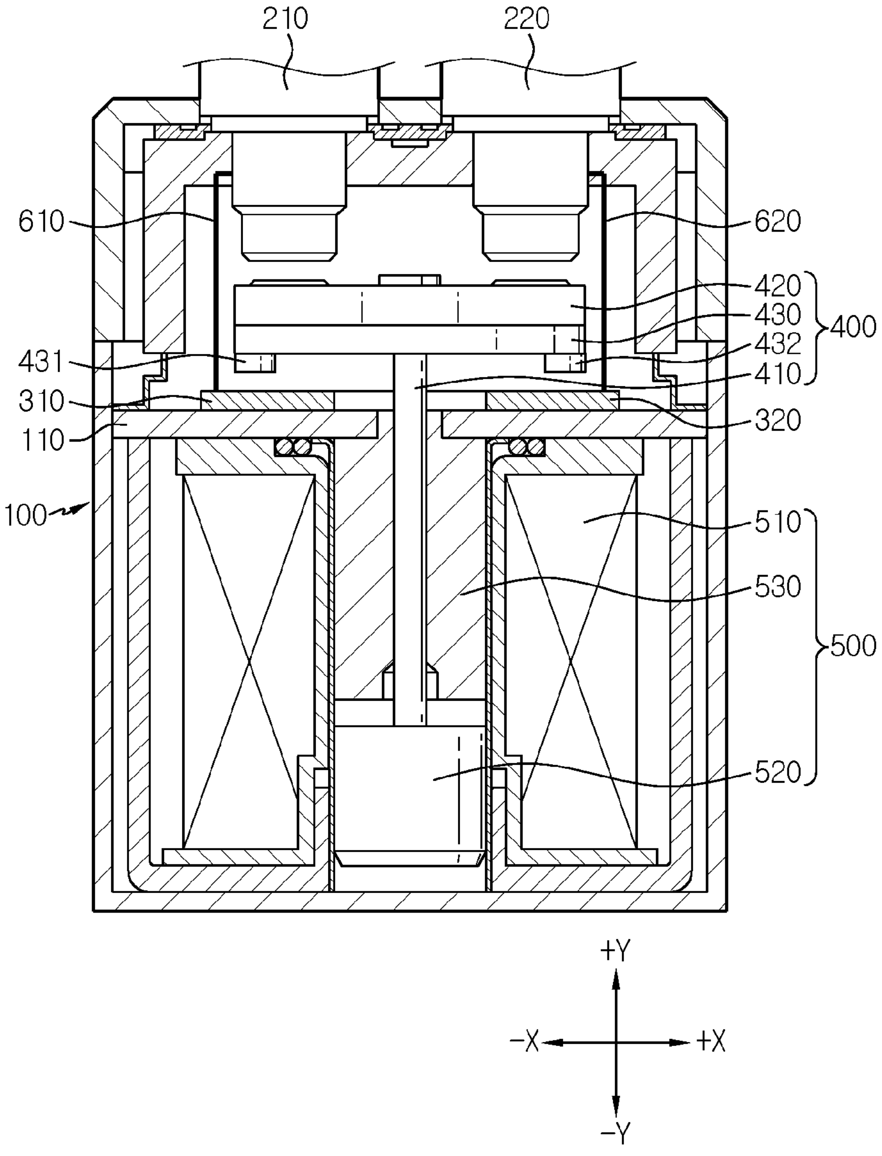
FIG. 3 schematically illustrates a structure of a relay switch device according to an embodiment of the present disclosure.
Figure 4:
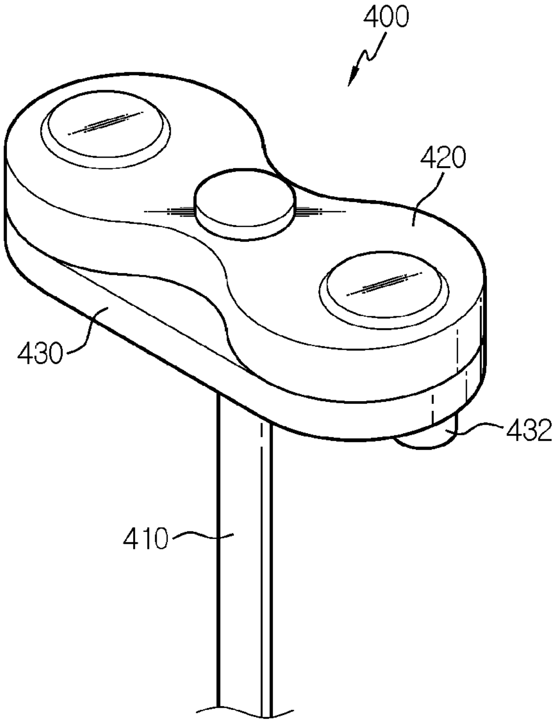
FIG. 4 is a perspective view of a circuit mode switch module of FIG. 3.

FIG. 3 is a view schematically illustrating a structure of a relay switch device according to an embodiment of the present disclosure, and FIG. 4 is a perspective view of a circuit mode switch module of FIG. 3.

Referring to FIGS. 3 and 4, the relay switch device according to an embodiment of the present disclosure includes a relay housing 100, a first upper fixing terminal 210, a second upper fixing terminal 220, a first lower fixing terminal 310, a second lower fixing terminal 320, a circuit mode switch module 400, and a driving module 500.

The relay housing 100 may be referred to as an injection structure for accommodating and protecting components to be described later in an interior space in a substantially rectangular box shape. For example, the relay housing 100 may include a lower cover and an upper cover that are injection-molded using a plastic resin, may be configured to accommodate components to be described later on the lower cover and assemble the upper cover, and may be provided to be fixed to a battery disconnect unit (BDU) housing (not shown) by using a bolt or the like.

The relay housing 100 may be manufactured in various shapes according to need. A window may be provided in the relay housing 100 or may be made of a transparent acrylic material, so that an operation state of the relay housing 100 may be visually checked.

The relay switch device is connected to an external current transmission line through the first upper fixing terminal 210 and the second upper fixing terminal 220. For example, outside the relay housing 100, the first upper fixing terminal 210 may be connected to a line extending to a battery pack, and the second upper fixing terminal 220 may be connected to a line extending to a load of an electric vehicle. The lines may be implemented by using bus bars, wires, or the like.

The first upper fixing terminal 210 and the second upper fixing terminal 220 may be arranged side by side with a predetermined distance from each other in a horizontal direction (±X-axis direction) across the inside and outside of the relay housing 100.

As shown in FIG. 3, the first upper fixing terminal 210 and the second upper fixing terminal 220 may be provided as a pair in the same shapes, and may be fixedly mounted on an upper end portion of the relay housing 100. The first upper fixing terminal 210 and the second upper fixing terminal 220 are forcedly fitted into two holes formed in the upper end portion of the relay housing 100, so that respective portions of the first upper fixing terminal 210 and the second upper fixing terminal 220 are inside the relay housing 100 and the remaining portions thereof are exposed to the outside of the relay housing 100.

Accordingly, for example, when a contact plate 420 to be described later contacts the first upper fixing terminal 210 and the second upper fixing terminal 220 physically apart from each other, a current may flow in the current transmission lines.

A first lower fixing terminal 310 may be provided apart from the first upper fixing terminal 210 by a predetermined distance in a vertical downward direction, and a second lower fixing terminal 320 may be provided apart from the second upper fixing terminal 220 by a predetermined distance in the vertical downward direction.

The first lower fixing terminal 310 and the second lower fixing terminal 320 may be provided as a pair in the same shapes, namely, in a metal plate shape, and may be spaced apart from each other and fixedly mounted within the relay housing 100.

The first upper fixing terminal 210 and the first lower fixing terminal 310 are connected to each other via wire or busbar so that a current may flow between the first upper fixing terminal 210 and the first lower fixing terminal 310, and likewise, the second upper fixing terminal 220 and the second lower fixing terminal 320 are connected to each other via wire or busbar so that a current may flow between the second upper fixing terminal 220 and the second lower fixing terminal 320.

For example, the first lower fixing terminal 310 and the second lower fixing terminal 320 may be fixedly mounted on partition walls 110 provided in an upper end portion of the driving module 500 by bonding, bolting, snap-fit welding, or the like. When the relay housing 100 is manufactured, the first lower fixing terminal 310 and the second lower fixing terminal 320 may be integrated with the relay housing 100 by insert injection.

According to the present embodiment, the first upper fixing terminal 210 is connected to the first lower fixing terminal 310 by using a first metal wire 610. One end of the first metal wire 610 may be welded to the first upper fixing terminal 210, and the other end thereof may be welded to the first lower fixing terminal 310. Similarly, the second upper fixing terminal 220 is connected to the second lower fixing terminal 320 by using a second metal wire 620.

The circuit mode switch module 400 may be configured to move a predetermined distance to selectively contact the first and second upper fixing terminals 210 and 220 or the first and second lower fixing terminals 310 and 320. The circuit mode switch module 400 may be configured so that respective node voltage values at the first and second upper fixing terminals 210 and 220 are substantially the same as each other when the circuit mode switch module 400 contacts the first upper fixing terminal 210 and the second upper fixing terminal 220 and a voltage difference is generated between the first upper fixing terminal 210 and the second upper fixing terminal 220 when the circuit mode switch module 400 contacts the first and second lower fixing terminals 310 and 320.

Such a configuration of the circuit mode switch module 400 enables switch from a pre-charge relay circuit mode to a main relay circuit mode or switch from the main relay circuit mode to the pre-charge relay circuit mode.

The pre-charge relay circuit mode may be referred to as a mode in which a current in a load gradually increases due to provision of an RC circuit between a battery pack and the load, and the main relay circuit mode may be referred to as a mode in which, when the magnitude of the current is a degree that does not affect the load, a current is supplied to the load without pre-charge resistance.

In detail, referring to FIGS. 3 and 4, the circuit mode switch module 400 according to the present embodiment includes a moving shaft 410, a contact plate 420, and a resistive member 430.

The moving shaft 410 may be disposed in an up-down direction (±Y-axis direction) and configured to be movable up and down within the relay housing 100. The present embodiment includes the driving module 500 including a coil portion 510 generating an electromagnetic force to drive the moving shaft 410 up and down.

The coil portion 510 may be separated from the first lower fixing terminal 310 and the second lower fixing terminal 320 by the partition wall 110, and may be interposed in a space surrounded by the partition wall 110 and an outer wall of the relay housing 100.

The coil portion 510 may be provided in a cylindrical shape with a central passage having an empty center. The moving shaft 410 may be disposed along the central passage, and an upper end thereof may be located in an upper region of the relay housing 100.

When a current flows in the coil portion 510 due to application of power, the coil portion 510 may act as an electromagnet. At this time, the moving shaft 410 may move upward or downward by the electromagnetic force of the coil portion 510.

For example, when the current is flowed to the coil portion 510 in one direction, the moving shaft 410 may move upward, and, when the current is flowed to the coil portion 510 in an opposite direction to the one direction, the moving shaft 410 may move downward. Alternatively, two coil portions 510, namely, a coil portion 510 for ascending the moving shaft 410 and a coil portion 510 for descending the moving shaft 410, may be used.

A moving core 520 capable of serving as a weight may be coupled to a lower end of the moving shaft 410. The moving core 520 may have a larger diameter and a higher weight than a diameter and a weight of the moving shaft 410. This moving core 520 limits a rapid movement of the moving shaft 410.

A fix core 530 having a hollow shape may be further provided in the central passage of the coil portion 510. An inner diameter of the fix core 530 is larger than the diameter of the moving shaft 410 so that the moving shaft 410 passes through the fix core 530, and is smaller than the diameter of the moving core 520.

The fix core 530 may be located in the central passage of the coil portion 510 to suppress a left and right flow of the moving shaft 410 and guide an elevating action, and may serve as a stopper that prevents the moving shaft 410 connected to the moving core 520 from being pushed up above a predetermined height, by limiting a movement of the moving core 520. When the moving core 520 and the fix core 530 are used, a movement of the moving shaft 410 may be more stably and precisely controlled.

According to the present embodiment, an electro-mechanical method using the coil portion 510 is employed to elevate and lower the moving shaft 410. However, as an alternative example, a mechanical mechanism using, for example, a combination of a rack, a pinion gear, and a servo motor or a pneumatic cylinder, may be employed to elevate and lower the moving shaft 410.

The contact plate 420 may be formed of an electrically conductive material and may be provided in the shape of a block or plate having a larger length than an interval between the first upper fixing terminal 210 and the second upper fixing terminal 220 so that a center of the block or plate is coupled to an uppermost end of the moving shaft 410.

When the moving shaft 410 ascends to a predetermined location, the contact plate 420 contacts the first upper fixing terminal 210 and the second upper fixing terminal 220. At this time, the first upper fixing terminal 210 and the second upper fixing terminal 220 are electrically connectable to each other through the contact plate 420, and thus a voltage is substantially constant between the first upper fixing terminal 210 and the second upper fixing terminal 220.

The resistive member 430 may include a resistor, an insulating case in which the resistor can be accommodated, and a first terminal 431 and a second terminal 432 connected to the resistor.

The first terminal 431 may have a button shape and may protrude from one portion of the lower surface of the resistive member 430, and the second terminal 432 may have a button shape and may protrude from the other portion of the lower surface of the resistive member 430. The one portion refers to a portion corresponding to a vertical upper portion of the first lower fixing terminal 310, and the other portion refers to a portion corresponding to a vertical upper portion of the second lower fixing terminal 320.

The resistive member 430 may be provided below the contact plate 420 to be coupled to the moving shaft 410.

According to this structure, when the moving shaft 410 descends to a predetermined location, the first terminal 431 of the resistive member 430 comes into contact with the first lower fixing terminal 310 and the second terminal 432 of the resistive member 430 comes into contact with the second lower fixing terminal 320. At this time, the first lower fixing terminal 310 and the second lower fixing terminal 320 enter a state capable of being electrically connected to each other, and, when a current flows through the first lower fixing terminal 310 and the second lower fixing terminal 320, the current passes through the resistor. Accordingly, a voltage drop occurs, and a voltage difference is generated between the first lower fixing terminal 310 and the second lower fixing terminal 320.

Because a voltage of the first lower fixing terminal 310 is the same as that of the first upper fixing terminal 210 and a voltage of the second lower fixing terminal 320 is the same as that of the second upper fixing terminal 220, a voltage difference between the first upper fixing terminal 210 and the second upper fixing terminal 220 is the same as that between the first lower fixing terminal 310 and the second lower fixing terminal 320.

Figure 5:
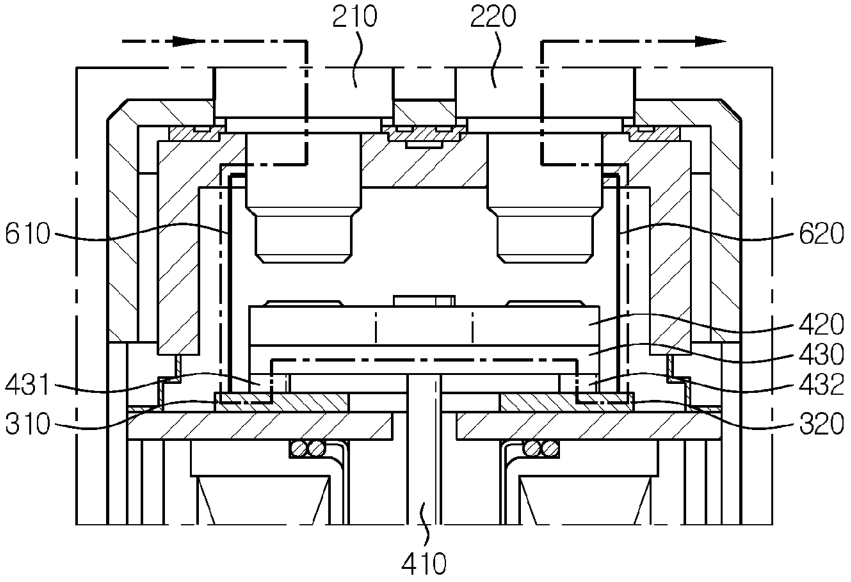
FIG. 5 illustrates an operation state of a relay switch device in a pre-charge relay circuit mode.
Figure 6:
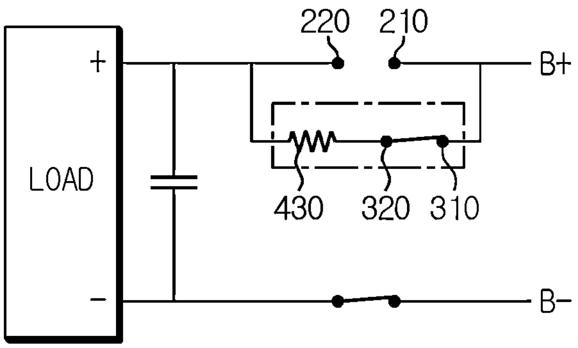
FIG. 6 is a circuit diagram in the pre-charge relay circuit mode of FIG. 5.
Figure 7:
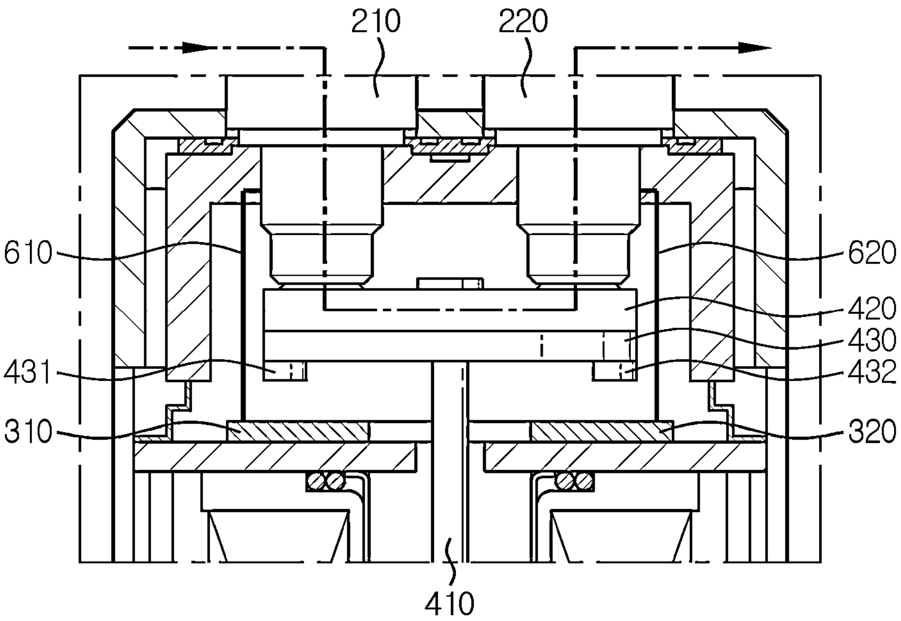
FIG. 7 illustrates an operation state of a relay switch device in a main relay circuit mode.
Figure 8:
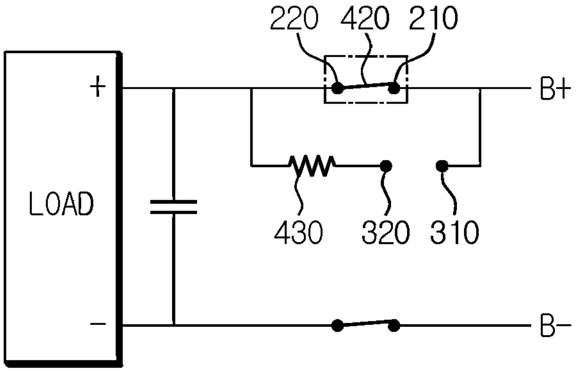
FIG. 8 is a circuit diagram in the main relay circuit mode of FIG. 7.

FIG. 5 illustrates an operation state of a relay switch device in a pre-charge relay circuit mode, FIG. 6 is a circuit diagram in the pre-charge relay circuit mode of FIG. 5, FIG. 7 illustrates an operation state of a relay switch device in a main relay circuit mode, and FIG. 8 is a circuit diagram in the main relay circuit mode of FIG. 7.

Referring to these drawings, an operation example of the relay switch device according to an embodiment of the present disclosure will now be described in brief.

When a battery pack and a load are intended to be electrically connected to each other, first, the moving shaft 410 is lowered to make the resistive member 430 contact the first lower fixing terminal 310 and the second lower fixing terminal 320.

Then, as shown in a current flow indicator line shown in FIG. 5, a current flows from a (+) terminal of a battery pack to respective (+) terminals of a capacitor through the first upper fixing terminal 210, the first metal wire 610, the first lower fixing terminal 310, the resistive member 430, the second lower fixing terminal 320, the second metal wire 620 and the second upper fixing terminal 220 in that order.

Therefore, according to the aforementioned configuration, as shown in FIG. 6, a circuit equivalent to a conventional RC circuit provided by turning off a high potential main relay and turning on a pre-charge relay may be provided.

Then, when a predetermined time elapses and a pre-charge target voltage is reached, the moving shaft 410 is raised to make the contact plate 420 contact the first upper fixing terminal 210 and the second upper fixing terminal 220.

Then, as shown in a current flow indicator line shown in FIG. 7, a current flows from the (+) terminal of the battery pack to the respective (+) terminals of the capacitor through the first upper fixing terminal 210, the contact plate 420 and the second upper fixing terminal 220 in that order.

Therefore, according to the aforementioned configuration, as shown in FIG. 8, a circuit equivalent to a conventional circuit provided by turning off a pre-charge relay and turning on a high potential relay may be provided.

A thermoelectric device designed to have the same resistance value as a conventional pre-charge resistor may be employed as the resistive member 430 of the circuit mode switch module 400.

The thermoelectric device may be a cooling thermoelectric device that performs thermoelectric cooling/heating inducing a temperature difference between one side and the other side or between one surface and the other surface by supplying electricity. Such a thermoelectric device may function as a resistor and may also reduce the temperature of the coil portion 510.

For example, in the pre-charge circuit mode, as shown in FIG. 5, the thermoelectric device may function as a resistor, and at this time, may be used to lower the internal temperature of the relay housing 100 by using supplied power as the operating power of the thermoelectric device.

The thermoelectric device may be attached to a lower portion of the contact plate 420 to be oriented in a lower direction of the relay housing 100 such that a cooling portion, namely, a heat absorbing side, faces the coil portion 510. However, the heat absorbing side and a heat generating side may be changed by changing a current supply direction.

A necessary voltage for an operating voltage of the coil portion 510 tends to increase as the temperature increases.

Therefore, when the temperature of the coil portion 510 is maintained low by using the cooling thermoelectric device as described above, problems such as incomplete contact of a contact that may be caused by an insufficient operating voltage of the coil portion 510 may be effectively prevented.

Figure 9:
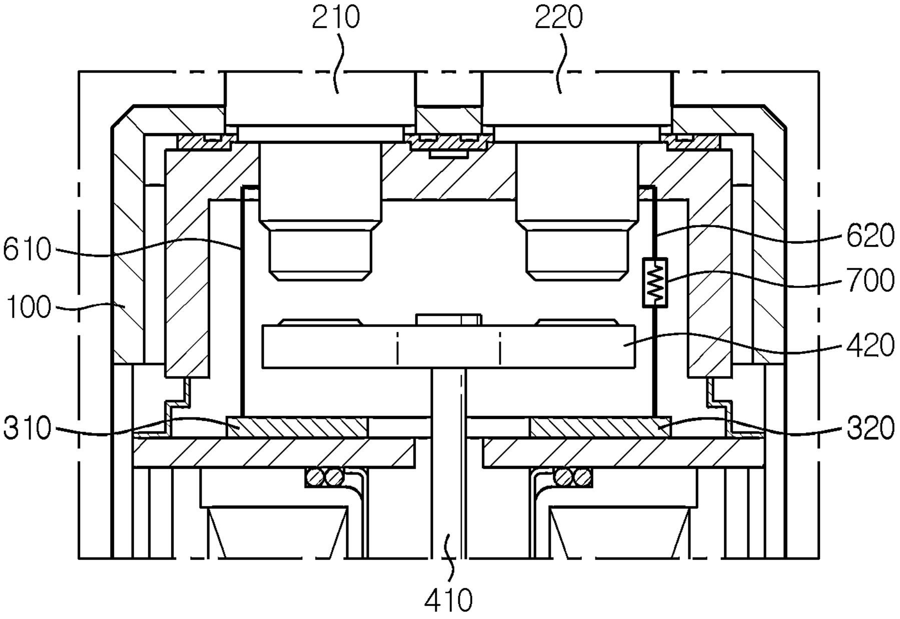
FIG. 9 schematically illustrates a structure of a relay switch device according to another embodiment of the present disclosure.

FIG. 9 schematically illustrates a structure of a relay switch device according to another embodiment of the present disclosure.

The relay switch device according to another embodiment of the present disclosure will now be described by referring to FIG. 9.

Reference numerals of FIG. 9 that are the same as those in the above-described embodiment denote the same members, and repeated descriptions of the same members will be omitted. Differences from the above-described embodiments will be mainly described.

When another embodiment of the present disclosure is compared with the above-described embodiment, the circuit mode switch module 400 includes the moving shaft 410, the contact plate 420, and a resistor 700.

The moving shaft 410 and the contact plate 420 are the same as those in the above-described embodiment, but the resistor 700 is provided in at least one of the first metal wire 610 and the second metal wire 620.

The relay switch device according to another embodiment of the present disclosure also enables switch between a pre-charge relay mode and a main relay mode, as in the above-described embodiment.

In other words, when the contact plate 420 descends and is attached to the first lower fixing terminal 310 and the second lower fixing terminal 320, a current may flow from the first upper fixing terminal 210 to the second upper fixing terminal 220 via the resistor, and thus a pre-charge relay circuit mode may be provided.

When the contact plate 420 ascends and is attached to the first upper fixing terminal 210 and the second upper fixing terminal 220, a current may flow from the first upper fixing terminal 210 to the second upper fixing terminal 220 without passing through the resistor 700, and thus a main relay circuit mode may be provided.

As described above, one relay switch device according to the present disclosure may replace the roles of a conventional high-potential main relay, a conventional pre-charge relay, and a conventional pre-charge resistor. When such a relay switch device is mounted, a pre-charge relay and a pre-charge resistor, for example, may not be used, which may be advantageous in reducing the size of a BDU.

A BDU according to the present disclosure may include the above-described relay switch device. The BDU may include, in addition to the relay switch device, a low-potential main relay, a current sensor, a busbar or wire as an electrical connection means, and a BDU housing for accommodating them.

The BDU may be accommodated in a battery pack.

A battery pack according to the present disclosure may include battery modules composed of the BDU and a plurality of secondary batteries, a Battery Management System (BMS) for controlling charging and discharging of the battery modules, and a pack case for accommodating them.

Although embodiments of the present disclosure have been illustrated and described above, the present disclosure is not limited to the above-described embodiments, and various modifications can be made by anyone with ordinary skill in the art to which the disclosure pertains, without departing from the gist of the present disclosure claimed in the claims.

Meanwhile, although terms indicating directions such as up, down, left, and right are used in the present specification, these terms are only for convenience of description, and it is apparent to those skilled in the art that these terms may vary depending on a position of a target object or a position of an observer.

What is claimed is:

1. A relay switch device that turns on/off a current flow on a current transmission line, the relay switch device comprising:

a relay housing forming an exterior of the relay switch device;

a first upper fixing terminal and a second upper fixing terminal arranged side by side and separated by a fixed distance, and extending through the relay housing;

a first lower fixing terminal electrically connected to the first upper fixing terminal and arranged under the first upper fixing terminal and separated by a predetermined distance from the first upper fixing terminal;

a second lower fixing terminal electrically connected to the second upper fixing terminal and arranged under the second upper fixing terminal and separated by the predetermined distance from the second upper fixing terminal; and a circuit mode switch module configured to be moveable by a predetermined distance and to selectively contact the first and second upper fixing terminals or the first and second lower fixing terminals, wherein node voltages in the first upper fixing terminal and the second upper fixing terminal are made substantially equal in response to the circuit mode switch module contacting the first and second upper fixing terminals, and wherein the node voltages in the first upper fixing terminal and the second upper fixing terminal are made substantially different in response to the circuit mode switch module contacting the first and second lower fixing terminals.

2. The relay switch device of claim 1, wherein the circuit mode switch module comprises:

a moving shaft configured to be elevated and lowered within the relay housing;

a contact plate made of an electrically conductive material, mounted on the moving shaft, and configured to contact the first and second upper fixing terminals when the moving shaft ascends to a first predetermined location; and a resistive member mounted on the moving shaft, positioned below the contact plate, and configured to contact the first and second lower fixing terminals to be electrically connectable to the first and second lower fixing terminals when the moving shaft descends to a second predetermined location, the resistive member comprising a resistor within an insulating case.

3. The relay switch device of claim 2, wherein the resistive member comprises:

a first terminal protruding downward from a first portion of the resistive member that faces the first lower fixing terminal; and a second terminal protruding downward from a second portion of the resistive member that faces the second lower fixing terminal.

4. The relay switch device of claim 2, wherein the resistive member is a thermoelectric device configured to absorb heat within the relay housing.

5. The relay switch device of claim 4, wherein the thermoelectric device is arranged such that a heat absorbing side faces a lower portion of the relay housing.

6. The relay switch device of claim 2, further comprising a driving module located below the first and second lower fixing terminals within the relay housing and comprising a coil configured to generate an electromagnetic force capable of moving the moving shaft.

7. The relay switch device of claim 6, wherein the coil portion is cylindrical and includes a central passage with an empty center, and the moving shaft extends along the central passage.

8. The relay switch device of claim 1, wherein the circuit mode switch module comprises:
- a moving shaft configured to be elevated and lowered within the relay housing;
- a contact plate connected to the moving shaft, and configured to selectively contact the first and second upper fixing terminals or the first and second lower fixing terminals according to an elevating/lowering operation of the moving shaft;
- a first wire connecting the first upper fixing terminal to the first lower fixing terminal;
- a second wire connecting the second upper fixing terminal to the second lower fixing terminal; and
- a resistor provided on at least one of the first wire and the second wire.

9. A battery disconnect unit including the relay switch device of claim 1.

10. A battery pack including the battery disconnect unit of claim 9.

* * * * *